Figure 1:
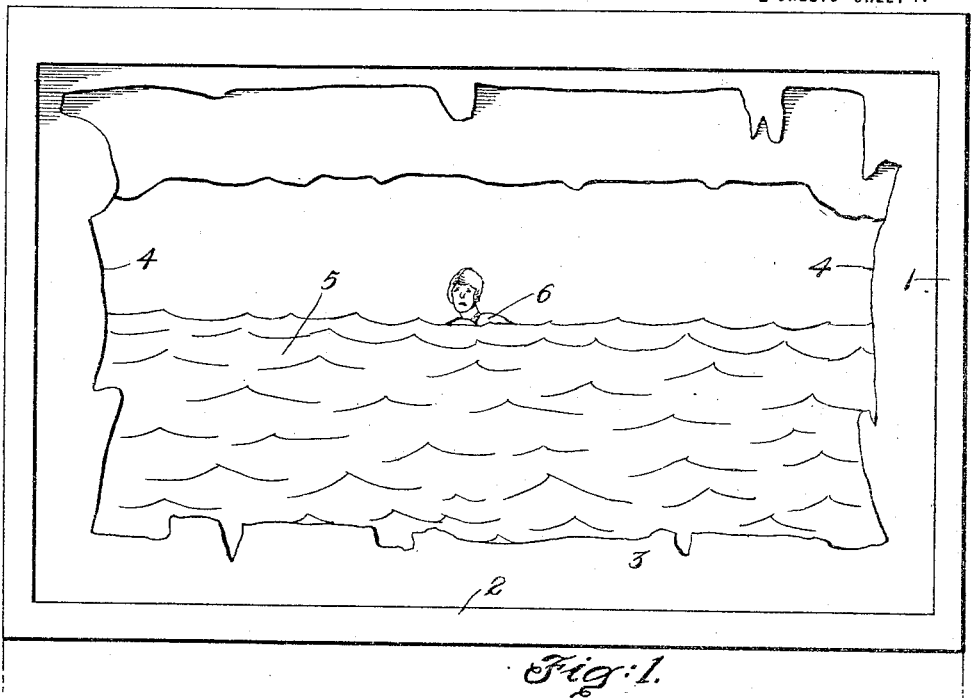

I. M. FULLER.
WAVE AND WATER ILLUSION APPARATUS.
APPLICATION FILED JAN. 26, 1916.

1,205,444.

Patented Nov. 21, 1916.
2 SHEETS—SHEET 1.

Inventor
Ida May Fuller,
By her Attorneys
Edwards, Sager & Wooster.

I. M. FULLER.
WAVE AND WATER ILLUSION APPARATUS.
APPLICATION FILED JAN. 26, 1916.

1,205,444.

Patented Nov. 21, 1916.
2 SHEETS—SHEET 2.

Inventor
Ida May Fuller,
By her Attorneys
Edwards, Sager & Wooster.

UNITED STATES PATENT OFFICE.

IDA MAY FULLER, OF NEW YORK, N. Y.

WAVE AND WATER ILLUSION APPARATUS.

1,205,444.  Specification of Letters Patent.  Patented Nov. 21, 1916.

Application filed January 26, 1916. Serial No. 74,328.

*To all whom it may concern:*

Be it known that I, IDA MAY FULLER, a citizen of the United States, residing at New York, in the county of New York and State of New York, have invented certain new and useful Improvements in Wave and Water Illusion Apparatus, of which the following is a full, clear, and exact specification.

This invention relates to water illusion apparatus and has particular reference to an apparatus for purposes of exhibition on the stage, or in conjunction with advertising devices, whereby the effect of a moving body of water can be obtained without actually employing water.

Although many attempts have been made to devise apparatus by which the illusion of water could be cheaply produced in connection with theatrical performances, dances, tableaux, etc., such devices have been unsatisfactory and have hampered the presentation of many effects which demand a very high degree of simulation of a body of water. For ordinary water effects, recourse has been had to large canvas painted to represent waves, and moved by mechanical or manual devices beneath the canvas. It has also been sought to make such devices more realistic by means of stereopticon pictures, colors, colored lights, etc., but all such attempts have been not only expensive and cumbersome, but unsatisfactory because of lack of realism.

By the present invention, a realistic illusion of a large body of water can be very cheaply produced on any ordinary stage, or in a show window advertising device, or in connection with dances, water scenes, tableaux, etc., without the use of expensive painted canvas, or mechanical appliances, or complicated side or wing scenery. I have obtained most realistic water effects, by means of an openwork support, such as a netting, having attached thereto in festoons on the front side a fabric such as silk which reflects light, and which is of such texture as to be easily waved back and forth by reciprocating air currents. Such air currents are preferably produced by a to-and-fro motion of the support itself, which is so light as to be held by one or more performers behind the support, who thereby appear to be in the water. Instead of having the performers move the support and the festooned fabric, so that it will billow back and forth similar to the waves of a body of water, a similar effect can be produced by applied air currents. The festooned fabric is of such length and depth as may be required to produce the desired expanse of water, and a water effect is obtained by ordinary water green colored silk without special external lighting effects. However, the external lighting used will vary according to the character of the scene to be presented, but where white silk is used, the effect is heightened by giving the exterior light a greenish color. A similar effect is obtained from ordinary exterior white lights if the material itself is somewhat colored. By projecting light upon a figure or object between the light and behind the support, an under water effect will be produced, as of an object such as a fish beneath the water. In order to produce the effect of shores or banks, the side wings may consist of vertically hung fine gauzes or nets, upon which stereopticon views representing trees, shores, etc., are projected, leaving the center clear for water illusion. The manner in which the effects of shores, coloring, etc., are produced is not essential to a full understanding of the invention, these being devices at present well known and to be used or not in connection with this invention according to the character of the effect desired.

Figure 2:
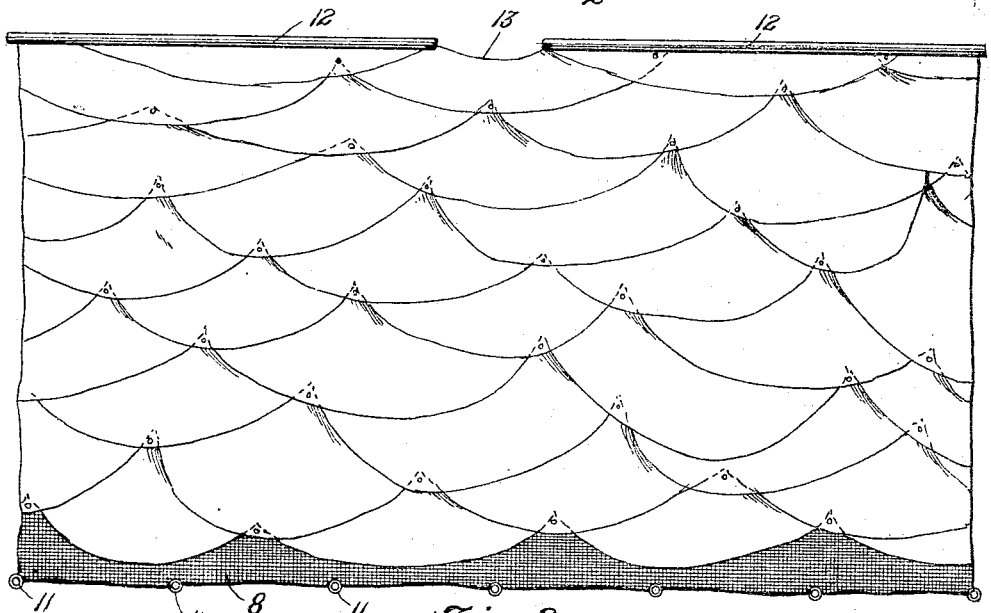
Figure 3:
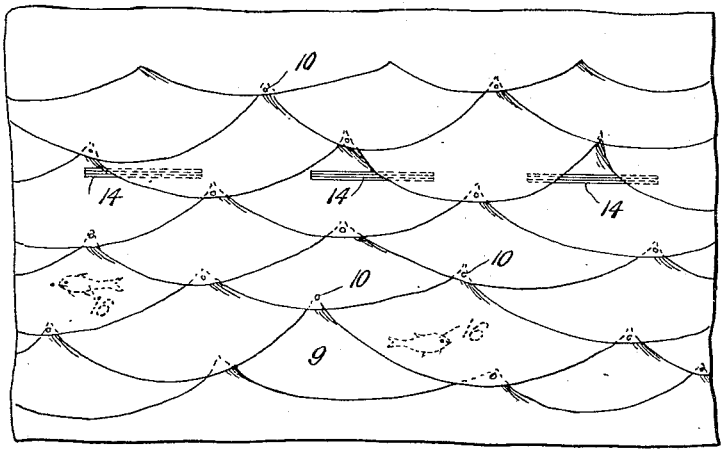
Figure 4:
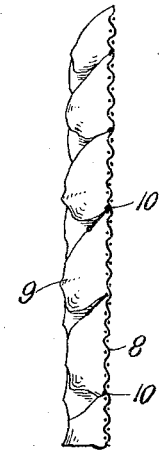

In the accompanying drawings, Figure 1 is a perspective view of a water scene produced by this invention; Fig. 2 is a detail on an enlarged scale showing the manner of festooning the fabric to the openwork support; Fig. 3 shows a somewhat different form than that shown in Fig. 2 adapted for the representation of a number of performers swimming in the water; Fig. 4 is a section in detail showing a preferred construction, and Fig. 5 is a section in detail on an enlarged scale of Fig. 1.

1, 1 represent the sides, and 2 the bottom of a stage opening, which is provided with the usual foreground or shield 3 and side wings 4.

5 represents the body of water to be represented by this invention, and 6 is a performer represented to be swimming in the water.

Figure 5:
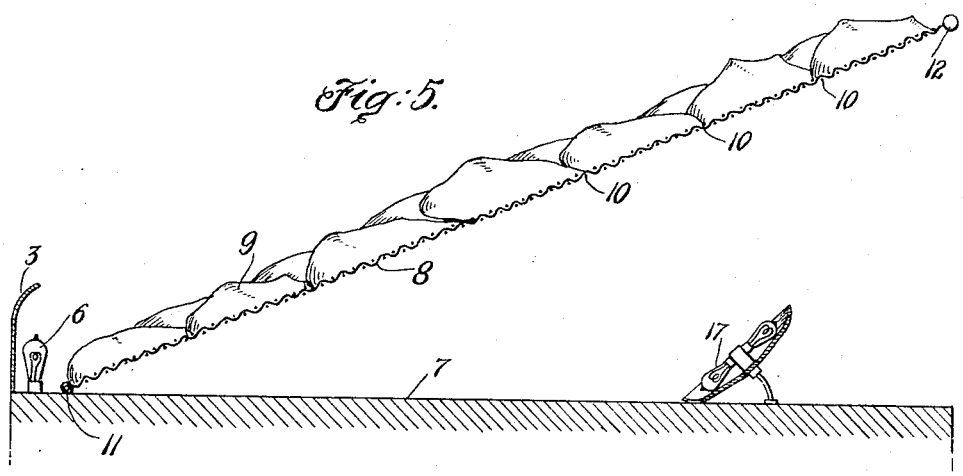

Referring to Fig. 5, the front of the stage is to the left of the shield 3; 6 represents an ordinary footlight and 7 represents the floor of the stage.

8 represents an openwork support, which is preferably a very light white netting which does not cast shadows and having secured on the front side thereof in festoons, a fabric 9. The fabric 9 is composed of a very light, fine texture translucent silk, and is loosely tacked or secured by threads to the support 8 at points 10, in such manner that the festoons formed thereby will overlap and cover the points of attachment, and move freely in response to air currents. Also, the fabric 9 is festooned in such manner that the points of support alternate in horizontal rows, as can be seen in Figs. 2 and 3. At the front end, the support 8 is weighted or otherwise attached as at 11 to the stage floor, and the rear top edge 12 of the support is preferably stiffened by light rods or sticks. A single performer, as shown in Fig. 1, can hold one in each hand. When the performer makes the proper rythmic motions back and forth, the festoons correspondingly billow back and forth relatively to the support, so that when properly lighted from outside a complete illusion of a moving body of water is produced. The external light is reflected from the shiny surface of the fabric in the same manner as sunlight is reflected from water ripples. The reflection of the exterior light from the shiny surface of the fabric is of importance in accentuating the effect of a rippling or billowy surface, while the attached parts of the cloth give the illusion of receding or falling into shadow. I have found that a complete water effect can thus be produced by a single performer simply holding the fabric outspread, and giving to the audience a very realistic and novel illusion of a person bathing. The sticks 12 are separated as at 13 to permit a close fit around the body of the performer.

In Fig. 3 is shown a detail in which the openwork and the light fabric are to be supported by a number of performers, whose heads or bodies will appear through slits 14. Where a number of performers are employed to support the illusory water surface, their movements will be arranged so that a billowy effect of the entire surface will be produced. The body openings 14 may be bound with elastic tape so as to fit securely. In each form, fish as 16, weeds, or other objects in the water can be made to realistically appear, by means of appropriately shaped articles beneath the cloth, and illuminated from beneath so at to cast shadows, by lights 17.

The side wings 4 can be ordinary painted drops, or can be made of fine nets upon which stereopticon views can be thrown to represent trees, banks, shrubbery, etc. Also, by throwing stereopticon views on the water itself, an illusion can be produced of fish swimming in the water, weeds, etc. The back of the stage behind the performers will, of course, represent a sky, horizon, or other desired background.

By stretching across the stage two wave devices, one behind the other, and held either inclined or horizontally, boats can be represented to travel across the stage. Very realistic effects of moving boats or ships at sea can be obtained in this manner, the boats running between the two wave devices.

It will be seen from the foregoing description that a wide range of highly realistic water effects can be produced in a very inexpensive manner, and without complicated apparatus. It will also be seen that in conjunction with stereopticons, motion picture apparatus, and special lighting appliances, a great variety of water illusion effects can be produced. It is to be understood that the invention is not to be restricted to the particular structure herein described, except as limited by the appended claims.

Having thus described my invention, I declare that what I claim as new and desire to secure by Letters Patent, is:—

1. An exhibition device for simulating water comprising a movable support, and a fabric festooned thereon so as to be capable of billowing when moved back and forth with the support.

2. An exhibition device for simulating water comprising an open-work support, and a light reflecting fabric festooned thereon so as to be capable of billowing when moved back and forth.

3. An exhibition device for simulating water comprising an open-work support, and a shiny fabric of light texture festooned thereon so as to be capable of billowing in response to air currents.

4. An exhibition device for simulating water comprising an inclined open work support, and a fabric of light texture festooned thereon in loose folds so as to be capable of billowing when subjected to intermittent air currents.

5. An exhibition device for simulating water comprising a netting support, and a light reflecting fabric festooned thereon so as to be capable of billowing when subjected to intermittent air currents.

6. An exhibition device for simulating water comprising a netting support, and silk fabric of light texture festooned thereon.

7. An exhibition device for simulating water comprising a bar, an open-work support depending therefrom, and a fabric festooned thereon so as to be capable of billowing when subjected to currents of air.

8. An exhibition device for simulating water comprising an open-work support, and a fabric festooned thereon so as to be capable of billowing when subjected to currents of air, said support and fabric having an opening through which a performer can appear.

9. An apparatus for producing the illusion of water comprising in combination with the floor of a stage or the like, an open-work support resting at its forward edge on the floor and extending across the width of the body of water and rearwardly away from the front of the stage to form a sufficient expanse, and a light reflecting fabric of light texture festooned on said open-work support in a manner to represent a rippled water surface, said festoons being capable of billowing when the support is moved back and forth.

10. An exhibition device for simulating water comprising an open-work support, and a translucent fabric festooned thereon so as to be capable of billowing when moved back and forth.

11. An exhibition device for simulating water comprising an open-work support, a translucent fabric festooned thereon so as to be capable of billowing when moved back and forth, and means for casting a shadow of an under water object on said fabric.

12. An exhibition device for simulating water comprising an open-work support, a translucent fabric festooned thereon so as to be capable of billowing when moved back and forth, and means for casting a shadow of an under water object on the inner side of said fabric.

13. The method of producing an illusion of a body of water, which consists in arranging a fabric in festoons to represent a water surface, and causing the festoons to billow back and forth in reflected light.

14. The method of producing an illusion of a body of water, which consists in arranging a fabric in festoons to represent a water surface, causing the festoons to billow back and forth in reflected light, and casting shadows on said fabric to represent under water objects.

15. The method of producing an illusion of a body of water, which consists in arranging a fabric in festoons to represent a water surface, causing the festoons to billow back and forth in reflected light, and casting shadows on the inner side of said fabric to represent under water objects.

In testimony whereof I affix my signature, in presence of two witnesses.

IDA MAY FULLER.

Witnesses:
J. S. WOOSTER,
MAY G. LOVE.

Copies of this patent may be obtained for five cents each, by addressing the "Commissioner of Patents, Washington, D. C."